Figure 1:
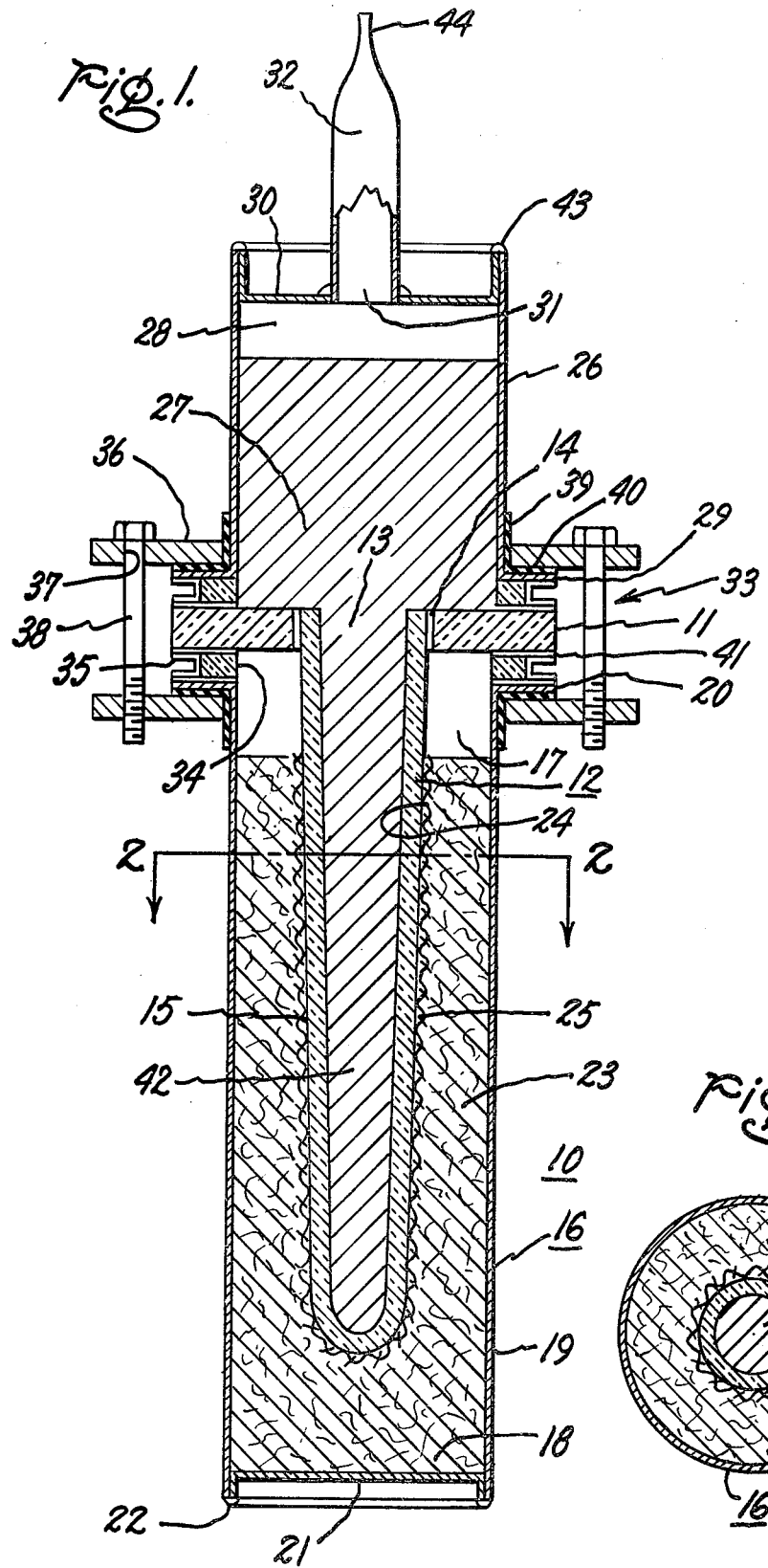

United States Patent [19]

Breiter et al.

[11] 4,140,841
[45] Feb. 20, 1979

[54] SULFUR ELECTRODE, SULFUR ELECTRODE CONTAINER AND METHODS OF MANUFACTURE

[75] Inventors: Manfred W. Breiter, Schenectady; Randall N. King, Johnstown, both of N.Y.

[73] Assignee: General Electric Company, Schenectady, N.Y.

[21] Appl. No.: 904,780

[22] Filed: May 11, 1978

[51] Int. Cl.² .............................................. H01M 4/58
[52] U.S. Cl. ..................................... 429/218; 429/104
[58] Field of Search ................................ 429/218, 104

[56] References Cited

U.S. PATENT DOCUMENTS

| 4,037,028 | 7/1977 | Méhauté et al. | 429/104 |
| 4,049,884 | 9/1977 | Desplanches et al. | 429/104 |
| 4,052,535 | 10/1977 | Robinson et al. | 429/104 |
| 4,076,900 | 2/1978 | Méhauté et al. | 429/104 X |
| 4,076,902 | 2/1978 | Senoo | 429/104 |

*Primary Examiner*—Charles F. LeFevour
*Attorney, Agent, or Firm*—Paul R. Webb, II; Joseph T. Cohen; Leo I. MaLossi

[57] ABSTRACT

A sulfur electrode is described which includes a sulfur-carbon plug with a central aperture extending partially therethrough, and at least one layer of an electronically insulating plain woven mesh material positioned within the central aperture and having its exterior surface in contiguous relation with the wall of the central aperture. A sulfur electrode container includes the above sulfur electrode positioned within an outer metallic casing which is substantially corrosion resistant to liquid sulfur and polysulfides. Methods are also described for making sulfur electrode containers.

3 Claims, 2 Drawing Figures

U.S. Patent      Feb. 20, 1979      4,140,841

SULFUR ELECTRODE, SULFUR ELECTRODE CONTAINER AND METHODS OF MANUFACTURE

This invention relates to a sulfur electrode, a sulfur electrode container and to methods for forming such electrodes and containers and, more particularly, to such a sulfur electrode and a sulfur electrode container containing an inner electronically insulating plain woven mesh material and, to methods of forming such electrodes and containers.

Sodium-sulfur cells, which operate at elevated temperatures, are known in the prior art as, for example, described in U.S. Pat. No. 3,946,751 issued Feb. 18, 1975, under the title "Cell Casing with a Hermetic Mechanical Seal and a Hermetically Sealed Sodium-Sulfur Cell." This patent is assigned to the General Electric Company.

In U.S. patent application Ser. No. 848,443, filed Nov. 4, 1977, under the title "Sodium Sulfur Cell Construction and Method," there is described a sodium-sulfur cell assembly and method of making a protective sleeve. In the sodium-sulfur cell assembly, there is provided a wrapping of resistive woven carbon mesh interposed between a sulfurous electrolyte and the outside surface of a sodium electrolyte container. The woven carbon mesh is formed by a wrapping of a plain woven mesh fabric reduced in a vacuum furnace to carbon.

The above-described U.S. application is assigned to the Electric Power Research Institute, Inc. subject to the reservation of license rights to the General Electric Company.

Our present invention is directed to providing an improved sulfur electrode, to a sulfur electrode container, and to improved methods of manufacturing such an electrode and a container over the above-identified patent and patent application in that there is utilized an inner electronically insulating plain woven mesh material within a central aperture in the sulfur electrode. The mesh material is not converted to a carbon mesh prior to insertion within the sulfur electrode.

The primary object of our invention is to provide an improved sulfur electrode, sulfur electrode container and an improved method of manufacturing such an electrode and a container wherein an inexpensive mesh material is easily handled and employed in the sulfur electrode.

In accordance with one aspect of our invention, a sulfur electrode includes a sulfur-carbon plug with a central aperture extending partially therethrough, and at least one layer of an electronically insulating plain woven mesh material positioned within the central aperture and having its exterior surface in contiguous relation with the wall of the central aperture.

Figure 2:
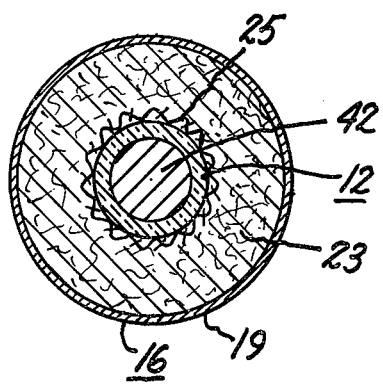

These and various other objects, features and advantages of the invention will be better understood from the following description taken in connection with the accompanying drawing in which:

FIG. 1 is a sectional view of a sodium-sulfur cell with a sulfur electrode and a sulfur electrode container made in accordance with our invention; and FIG. 2 is a sectional view through the sulfur electrode and the sulfur electrode container of FIG. 1 taken on line 2—2 thereof.

In FIG. 1 of the drawing, there is shown a sodium-sulfur cell 10 of the type described in above-mentioned U.S. Pat. No. 3,946,751 with the improved sulfur electrode and the sulfur electrode container of the present invention. Cell 10 has an electrically insulating ceramic ring 11, an inner casing 12 of a solid sodium ion-conductive material 12 with one open end 13, and a glass seal 14 sealing a portion of the outer wall 15 of inner casing 12 adjacent its open end 13 within and to the ceramic ring 11. An improved composite sulfur electrode container 16 has opposite open ends 17 and 18, and an outer metallic casing 19 substantially corrosion resistant to liquid sulfur and polysulfides with a flange 20 at open end 17 of container 16. Container 16 surrounds inner casing 12 and is spaced therefrom.

A metallic end cap 21 which is substantially corrosion resistant to liquid sulfur and polysulfides is shown fitted and sealed as by welding at 22 within and adjacent open end 18 of container 16. A sulfur-carbon plug 23 with a central aperture 24 extending partially therethrough is positioned within outer casing 19. A layer 25 of an electronically insulating plain woven mesh material of cotton muslin is positioned within central aperture 24 and has its exterior surface in contiguous relation with the wall of central aperture 24 and has its interior surface in contiguous relation with outer wall 15 of inner casing 12. Sulfur-carbon plug 23 with mesh member 25 form the improved sulfur electrode of the present invention while sulfur-carbon plug 23 with mesh member 25 with outer casing 19 form the improved sulfur electrode container.

A sodium container 26 has opposite open ends 27 and 28 and a flange 29 at open end 27. Sodium container 26 extends in an opposite direction to sulfur electrode container 16. A metallic end cap 30 for opposite open end 28 of sodium container 26, has a fill opening 31 in end cap 30, and a fill tube 32 affixed to end cap 30 and in communication with fill opening 31.

Sulfur and sodium metallic containers 16 and 26 are shown joined to ceramic ring 11 by a hermetic mechanical seal shown generally at 33 thereby forming a continuous container. Seal 33 comprises a pair of retainer rings 34, each of which is positioned between ceramic ring 11 and an adjacent flange 20 or 29 of containers 16 and 26, respectively. A pair of "C" shaped sealing rings 35 are positioned similarly to rings 34, but surround exteriorly and are spaced from rings 34. The open portion of each "C" shaped sealing ring faces outwardly. A retaining collar 36 is positioned around each container and adjacent to the opposite surface of the casing flange. Each collar 36 has at least a pair of and preferably a plurality of apertures 37 therethrough. The collars are positioned so that the respective apertures 37 are aligned. Threaded fasteners 38, each passing through a pair of associated apertures, are employed to tighten the mechanical seal to produce a hermetic mechanical seal 33. Electrical insulation 39 in the form of fiberglass tape is shown wound around the exterior surface of containers 16 and 26 adjacent the respective flanges 20 and 29 to prevent short-circuiting of the cell by seal 33. Electrical insulation 40 in the form of an inorganic fiber cloth ring is positioned between each flange 20 and 29 and the surface of each associated collar 36 to prevent short-circuiting of the cell by seal 33. While the opposite surfaces of ceramic ring 11 are smooth to insure a good seal, there is shown also a preferred ring 41 of aluminum foil between the opposite surface of retainer ring 34 and sealing ring 35 and the associated surface of ceramic ring 11 to provide a smoother surface. Hermetic mechanical seal 33 is shown in its tightened or hermetic position. A negative electrode 42 of sodium metal is positioned preferably within inner casing 12 and partially within sodium container 27. A void volume is provided between ceramic ring 11 and the upper portion of positive electrode 23 to provide space for reactant during operation of the cell. Fill tube 32 is shown closed in any suitable manner such as by a weld 43. End cap 30 is affixed to container 26 as by crimping at 44. The resulting structure is a hermetically sealed sodium-sulfur cell.

In FIG. 2 of the drawing, there is shown a sectional view through the improved sulfur electrode and sulfur electrode container of FIG. 1 taken on line 2—2 thereof. The same numerals are used in the description of FIG. 2 as were employed in the description of FIG. 1. Sulfur electrode container 16 surrounds inner casing 12 and is spaced therefrom. Outer casing 19 has positioned therein sulfur-carbon plug 23 with mesh material 25 within its central aperture 24. Negative electrode 42 of sodium metal is positioned within inner casing 12.

We found that we could form an improved sulfur electrode. The sulfur electrode has a sulfur-carbon plug with a central aperture extending partially therethrough. The sulfur-carbon plug comprises generally a pre-cast cylindrical body of sulfur and carbon mat with a central aperture partially therethrough. The carbon mat is impregnated with sulfur. At least one layer of an electronically insulating plain woven mesh material is positioned within the central aperture. The exterior surface of the mesh material is in contiguous relation with the wall of the central aperture. While a single layer of mesh material is suitable, two layers of mesh material are preferred. The layer can also be in other forms so as in the form of a bag. Two bags can be employed to provide two layers of mesh material. Various fabrics can be used for the electronically insulating plain woven mesh material. Plain woven pertains to a weave in which the threads interlace alternately thereby providing substantial strength. Various forms of muslin are suitable for the mesh material. Muslin, as is known, is a plain woven sheer to coarse cotton fabric. The mesh material is employed without treatment or without vacuum firing to a carbon mesh as described in above-identified patent application Ser. No. 848,443. The mesh material is inexpensive and easily handled.

We found that we could form an improved sulfur electrode container. The container has an outer metallic casing with opposite open ends which is substantially corrosion resistant to liquid sulfur and polysulfides. It may be desirable, depending on the type of sulfur electrode container and on the method of joining such container to form a sodium-sulfur battery, to provide an outwardly or inwardly extending flange at one end of outer casing. As it is shown in both FIGS. 1 and 2 of the drawing, an outwardly extending flange is employed. Such a flange configuration is used in view of the hermetic mechanical seal employed in the sodium-sulfur battery in which it is used. Since other sealing methods are available for affixing the sulfur electrode container as a portion of the sodium-sulfur cell, such an outwardly extending flange might not be required. However, we will describe an embodiment of the sulfur electrode container of our invention which can be employed in the cell shown in FIGS. 1 and 2 of the drawing and described above. The outer metallic casing, which is substantially corrosion resistant to liquid sulfur and polysulfides, is made of a suitable metal, such as stainless steels or nickel-chromium alloys. Additionally, the outer metallic casing may be of a material corrodible by liquid sulfur and polysulfides, but include a liner or a protective layer as a part thereof whereby the outer casing is substantially corrosion resistant to liquid sulfur and polysulfides.

We found that we could then position a metallic end cap substantially resistant to corrosion by liquid sulfur and polysulfides within the open end of the outer casing opposite to the open end having a flange. The metallic end cap is then sealed as by welding within and adjacent the open end of the outer casing. In another embodiment of the invention, the end cap is not positioned in the open end of the outer casing, nor sealed therein until a later step in the formation of the container. The sulfur electrode comprising the sulfur-carbon plug with its mesh member is positioned within the outer casing to form the sulfur electrode container of our invention.

We found that the electronically insulating plain woven mesh material can be employed without further treatment in our improved sulfur electrode and sulfur electrode container to form a protective sleeve between the solid sodium ion-conductive tube and the sulfur in the sulfur electrode to inhibit formation of a resistive layer of sulfur around the tube during the operation of a sodium-sulfur cell in which the mesh member is employed. From visual inspection of sodium-sulfur cells after operation, it appears that the mesh member is converted to a carbon mesh when the cell is heated to operating condition.

A sodium-sulfur cell is then assembled as above described, employing the improved sulfur electrode and sulfur electrode container of our invention. In the assembly of the sulfur electrode and sulfur electrode container in the sodium-sulfur cell, as shown in FIGS. 1 and 2 of the drawing, the sulfur-carbon plug, with at least one layer of an electronically insulating plain woven fiber positioned within its central aperture is positioned within the outer casing and in contact with its inner surface from the opposite open end of the outer casing. The sulfur electrode container, including the sulfur-carbon plug, with its mesh member insert, is then hermetically sealed by means of its flange to the ceramic ring in the sodium-sulfur cell.

Examples of sulfur electrodes, sulfur electrode containers and methods of manufacturing such electrodes and containers made in accordance with our invention, are set forth below:

EXAMPLE I

A sulfur electrode was formed as above described and as is shown in FIGS. 1 and 2 of the drawing by providing a sulfur-carbon plug with a central aperture extending partially therethrough. One layer of an electronically insulating plain woven mesh material of 100% cotton muslin was positioned within the central aperture. The exterior surface of the muslin was in contiguous relation with the wall of the central aperture. The resulting device was a sulfur electrode made in accordance with our invention.

EXAMPLE II

A sulfur electrode container was formed as above described and as is shown in FIGS. 1 and 2 of the drawing by providing an outer casing of 347 stainless steel with an open end substantially corrosion resistant to liquid sulfur and polysulfides. A sulfur-carbon plug with a central aperture extending partially therethrough was provided. One layer of an electronically insulating plain woven mesh material of 100% cotton muslin was positioned within the central aperture. The exterior surface of the muslin was in contiguous relation with the wall of the central aperture. The sulfur-carbon plug with muslin layer in its central aperture was positioned in outer casing through its open end so that the central aperture with muslin layer was facing toward the open end of the outer casing. The resulting device was a sulfur electrode container made in accordance with our invention.

EXAMPLE III

A sulfur electrode was formed as above described and as shown in FIGS. 1 and 2 of the drawing by providing a solid ion-conductive electrolyte tube having an open end and sealed adjacent its open end to an electrically insulating ceramic ring. One layer of an electronically insulating plain woven mesh material of 100% cotton muslin was positioned around the exterior surface of the solid ion-conductive electrolyte tube. A sulfur-carbon plug with a central aperture extending partially therethrough was positioned around the solid ion-conductive electrolyte tube and the plain woven mesh material whereby the exterior surface of the plain woven mest material was in contiguous relation with the wall of the central aperture. An outer casing of 347 stainless steel with an open end, substantially corrosion resistant to liquid sulfur and polysulfides, was positioned around the exterior surface of the sulfur-carbon plug. The open end of the outer casing was sealed by a mechanical seal to one major surface of the ceramic ring.

EXAMPLE IV

The sulfur electrode container of Example II was employed in a sodium-sulfur cell of the type described above and shown in FIGS. 1 and 2 of the drawing. The cell had an electrically insulating ceramic ring of alpha alumina, an inner casing of solid sodium beta alumina in tube form with one open end, and a glass seal sealing a portion of the outer wall of the inner casing adjacent its open end within and to the ceramic ring. A sodium container of metal had opposite open ends and a flange at one open end. An end cap was welded to the open end of the sodium container opposite to the open end having a flange. A fill opening was provided in the end cap and a fill tube affixed to the end cap and in communication with the fill opening.

A ring of aluminum foil was positioned on the upper surface of the ceramic ring. A retainer ring was positioned on the upper surface of the aluminum foil and surrounded by "C" shaped sealing ring with its opening facing outwardly. The flange of the sodium container was positioned on the upper surface of both the retainer ring and the "C" shaped sealing ring. Fiberglass tape was wound around the exterior surface of the sodium container adjacent its flange. An inorganic fiber cloth ring was positioned around the upper surface of the flange of the sodium container.

The sulfur electrode container of Example II, with its sulfur-carbon plug and mesh material was positioned to surround the beta-alumina tube, whereby the tube was fitted into the opening within the sulfur-carbon plug and in contact with the mesh material. As described above, the sulfur electrode container was positioned on the opposite surface of the ceramic ring in the same manner as was the sodium container. A retaining collar was positioned around each container and adjacent to the opposite surface of the casing portion flange. Each collar had a plurality of apertures therethrough. The collars were positioned so that the respective apertures were aligned. A threaded fastener passed through each pair of associated apertures. These fasteners were then tightened to provide a hermetic mechanical seal for the cell. The threaded fasteners were tightened to a pressure of about 300 lbs. to provide a complete hermetic mechanical seal. The interior of the inner casing and a portion of the sodium container were filled with liquid sodium through the fill tube. The fill tube was then closed by crimping its end.

EXAMPLE V

The cell of Example IV was positioned in a furnace and heated to a cell operating temperature of 315° C. The cell was charged and discharged over 235 cycles in a completely satisfactory manner.

While other modifications of the invention and variations thereof which may be employed within the scope of the invention have not been described, the invention is intended to include such as may be embraced within the following claims:

What we claim as new and desire to secure by Letters Patent of the United States is:

1. A sulfur electrode for use in a sulfur electrode container as a portion of a sodium-sulfur cell which comprises a cylindrical sulfur-carbon plug with a central aperture extending partially therethrough, and at least one layer of an electronically insulating plain woven mesh material positioned within the central aperture and having its exterior surface in contiguous relation with the wall of the central aperture.

2. A sulfur electrode, as in claim 1, in which the electronically insulating plain woven mesh material is muslin.

3. A sulfur electrode container for use as a portion of a sodium-sulfur cell which comprises an outer metallic casing substantially corrosion resistant to liquid sulfur and polysulfides, a cylindrical sulfur-carbon plug with a central aperture extending partially therethrough positioned within the outer casing, and at least one layer of an electronically insulating plain woven mesh material positioned within the central aperture and having its exterior surface in contiguous relation with the wall of the central aperture.

* * * * *